United States Patent
Cao et al.

(10) Patent No.: US 10,031,761 B2
(45) Date of Patent: Jul. 24, 2018

(54) PLUGGABLE CLOUD ENABLEMENT BOOT DEVICE AND METHOD

(71) Applicant: International Business Machines Corporation, Armonk, NY (US)

(72) Inventors: Bin Cao, Rochester, MN (US); Xi Lun Chen, Beijing (CN); Xiao Bin Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 873 days.

(21) Appl. No.: 14/051,842

(22) Filed: Oct. 11, 2013

(65) Prior Publication Data
US 2015/0106521 A1    Apr. 16, 2015

(51) Int. Cl.
G06F 15/173    (2006.01)
G06F 9/4401    (2018.01)
G06F 9/455     (2018.01)
H04L 12/24     (2006.01)

(52) U.S. Cl.
CPC ........ *G06F 9/4416* (2013.01); *G06F 9/45558* (2013.01); *H04L 41/5054* (2013.01); *G06F 2009/45562* (2013.01); *H04L 41/5058* (2013.01); *H04L 41/5096* (2013.01)

(58) Field of Classification Search
CPC ..... H04L 47/70; G06F 9/4416; G06F 9/4401; G06F 9/4408; H04N 21/443; H04N 21/6543
USPC .............................. 709/226; 713/2, 100, 175
See application file for complete search history.

(56) References Cited

U.S. PATENT DOCUMENTS

| 6,754,818 | B1 | 6/2004 | Lee et al. |
| 7,971,045 | B1 | 6/2011 | Currid et al. |
| 7,991,989 | B2 | 8/2011 | Cherian et al. |
| 8,181,174 | B2 | 5/2012 | Liu |
| 8,302,091 | B2 | 10/2012 | Aridor et al. |
| 8,468,226 | B2 | 6/2013 | Negai |
| 8,874,888 | B1 | 10/2014 | Beda, III et al. |
| 2003/0236970 | A1* | 12/2003 | Palmer et al. ............... 713/1 |

(Continued)

OTHER PUBLICATIONS

How do I try Jolicloud and Joli OS without installing it? :Jolicloud Help Center, Jul. 25, 2013.

(Continued)

*Primary Examiner* — Thuong Nguyen
(74) *Attorney, Agent, or Firm* — Martin & Associates, LLC; Derek P. Martin

(57) ABSTRACT

A pluggable cloud enablement boot device (PCEBD) is a bootable device that includes all information needed to automatically provision hardware and software to create a computing solution that meets customer requirements. This allows for quickly deploying a computing solution in a manner that eliminates many manual steps that are typically performed today. The PCEBD uses firmware to verify a given platform has sufficient resources to deploy the PCEBD. The computing solution, once provisioned and running, can be modified, and these modifications may be reflected in the definition of the PCEBD. In addition, a computing solution may include multiple resources provisioned from multiple PCEBDs, which can be packaged into a PCEBD that will include other PCEBDs. The result is a way to deploy computing solutions that is much more efficient than the manual methods used in the prior art.

10 Claims, 13 Drawing Sheets

(56) References Cited

U.S. PATENT DOCUMENTS

| | | | |
|---|---|---|---|
| 2006/0107119 A1* | 5/2006 | Miller | G06F 9/4406 714/36 |
| 2007/0022133 A1 | 1/2007 | Barghouthi | |
| 2007/0283343 A1* | 12/2007 | Aridor | G06F 8/67 717/174 |
| 2008/0126773 A1* | 5/2008 | Martinez et al. | 713/1 |
| 2009/0006534 A1 | 1/2009 | Fries et al. | |
| 2009/0172662 A1 | 7/2009 | Liu | |
| 2010/0125664 A1 | 5/2010 | Hadar et al. | |
| 2010/0186010 A1 | 7/2010 | Chalemin et al. | |
| 2010/0306355 A1 | 12/2010 | Lagergren et al. | |
| 2011/0022192 A1* | 1/2011 | Plache | G05B 19/4188 700/28 |
| 2011/0078680 A1 | 3/2011 | Lagergren et al. | |
| 2012/0260082 A1* | 10/2012 | Bobzin | 713/100 |
| 2012/0266169 A1 | 10/2012 | Lagergren et al. | |
| 2014/0025961 A1* | 1/2014 | Mackintosh et al. | 713/189 |
| 2014/0282483 A1* | 9/2014 | Zhang et al. | 717/173 |
| 2014/0298091 A1* | 10/2014 | Carlen et al. | 714/15 |
| 2015/0106606 A1 | 4/2015 | Cao et al. | |
| 2015/0106607 A1 | 4/2015 | Cao et al. | |
| 2015/0106610 A1 | 4/2015 | Cao et al. | |
| 2015/0106611 A1 | 4/2015 | Cao et al. | |
| 2015/0106612 A1 | 4/2015 | Cao et al. | |
| 2015/0236973 A1 | 8/2015 | Jackson | |

OTHER PUBLICATIONS

Cloudusb.net Download page, cloudusb.net/?DOWNLOAD, Jul. 25, 2013.

* cited by examiner

PLUGGABLE CLOUD ENABLEMENT BOOT DEVICE AND METHOD

BACKGROUND

1. Technical Field

This disclosure generally relates to computer systems, and more specifically relates to deploying cloud-based computing solutions to a cloud computing environment.

2. Background Art

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources to different computing environments known as virtual machines. The System X computer system developed by IBM is an example of a computer system that supports logical partitioning into multiple virtual machines. If multiple virtual machines on a System X computer system are desired, partition manager code (referred to as a "hypervisor" in IBM terminology) is installed that allows defining different virtual machines on the same platform. Once the partition manager is installed, virtual machines may be created that define different computing environments. The partition manager manages the logical partitions to assure that they can share needed resources in the computer system while maintaining the separate computing environments defined by the virtual machines.

Virtual machines are used extensively in computing solutions that are cloud-based. As the demands for cloud solutions increase, open source software for building clouds, such as OpenStack, have become a building block for creating a reliable and flexible cloud platform. With increasing complexities and demands, cloud deployment and enablement is one of the major hurdles for cloud computing. For example, to deploy a cloud infrastructure not only involves complex manipulation of physical nodes, but also various software tools, packages and configurations.

Within a typical distributed cloud environment, there are many nodes assigned with various roles such as: Cloud Controller, Network Controller, Compute Node, and Storage Nodes. Each role requires different software packages, configurations, service end points, operating system customization, firewall rules, network settings, storage setup, security, usability, etc. Cloud enablement is currently handled by field engineers who manually configure the cloud environment, and deployment time can take weeks and is very error-prone.

BRIEF SUMMARY

A pluggable cloud enablement boot device (PCEBD) is a bootable device that includes all information needed to automatically provision hardware and software to create a computing solution that meets customer requirements. This allows for quickly deploying a computing solution in a manner that eliminates many manual steps that are typically performed today. The PCEBD uses firmware to verify a given platform has sufficient resources to deploy the PCEBD. The computing solution, once provisioned and running, can be modified, and these modifications may be reflected in the definition of the PCEBD. In addition, a computing solution may include multiple resources provisioned from multiple PCEBDs, which can be packaged into a PCEBD that will include other PCEBDs. The result is a way to deploy computing solutions that is much more efficient than the manual methods used in the prior art.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Figure 1:
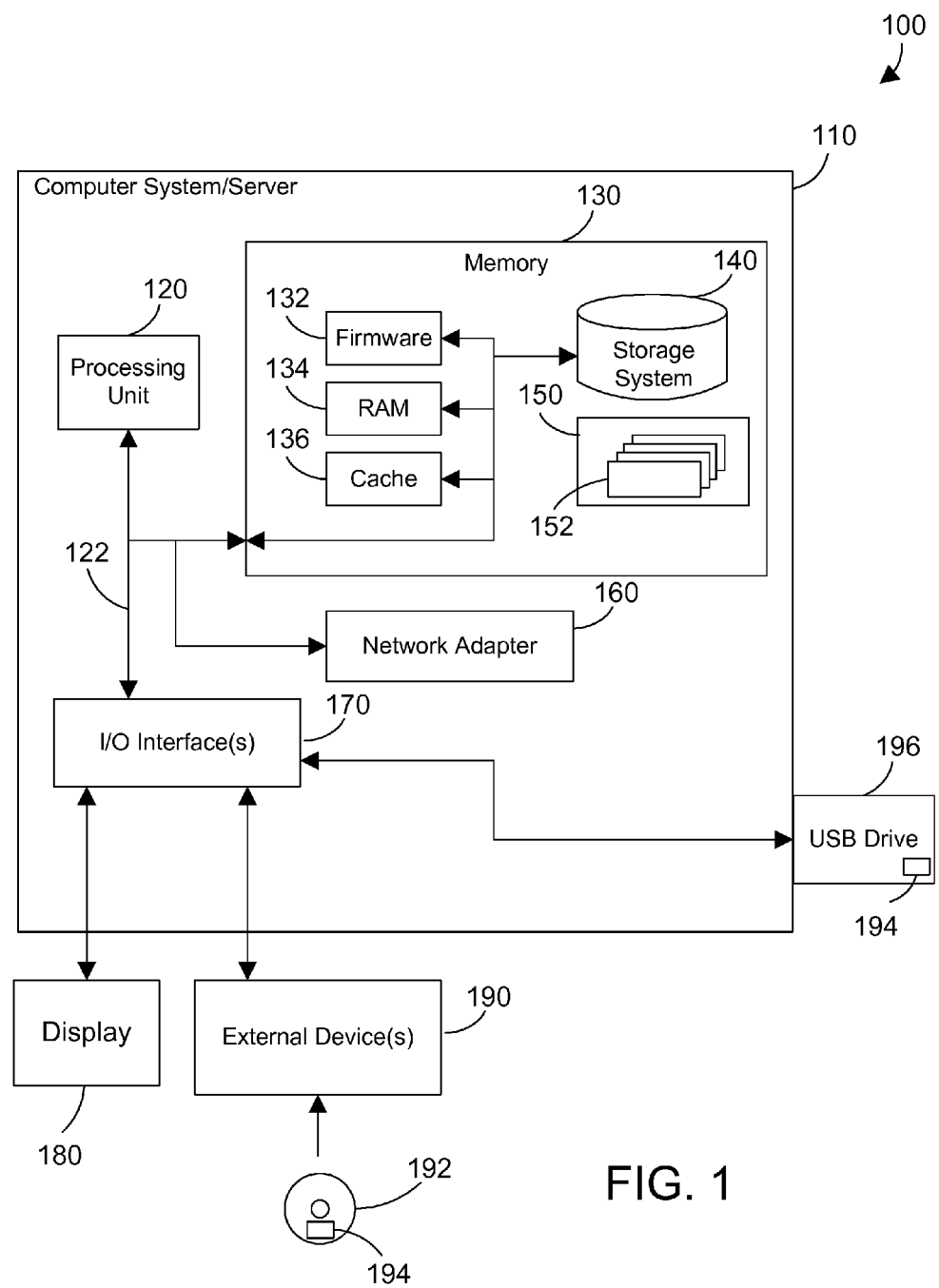
FIG. 1 is a block diagram of a cloud computing node.

The disclosure and claims herein relate to a pluggable cloud enablement boot device (PCEBD) that is a bootable device that includes all information needed to automatically provision hardware and software to create a computing solution that meets customer requirements. This allows for quickly deploying a computing solution in a manner that eliminates many manual steps that are typically performed today. The PCEBD uses firmware to verify a given platform has sufficient resources to deploy the PCEBD. The computing solution, once provisioned and running, can be modified, and these modifications may be reflected in the definition of the PCEBD. In addition, a computing solution may include multiple resources provisioned from multiple PCEBDs, which can be packaged into a PCEBD that will include other PCEBDs. The result is a way to deploy computing solutions that is much more efficient than the manual methods used in the prior art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. Examples of removable media are shown in FIG. 1 to include a Digital Video Disc (DVD) 192 and a USB drive 196, each of which may include a bootable image 194 discussed in more detail below.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. One suitable example of an external device 190 is a DVD drive, which can receive and read the bootable image 194 from a DVD 192 as shown in FIG. 1. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
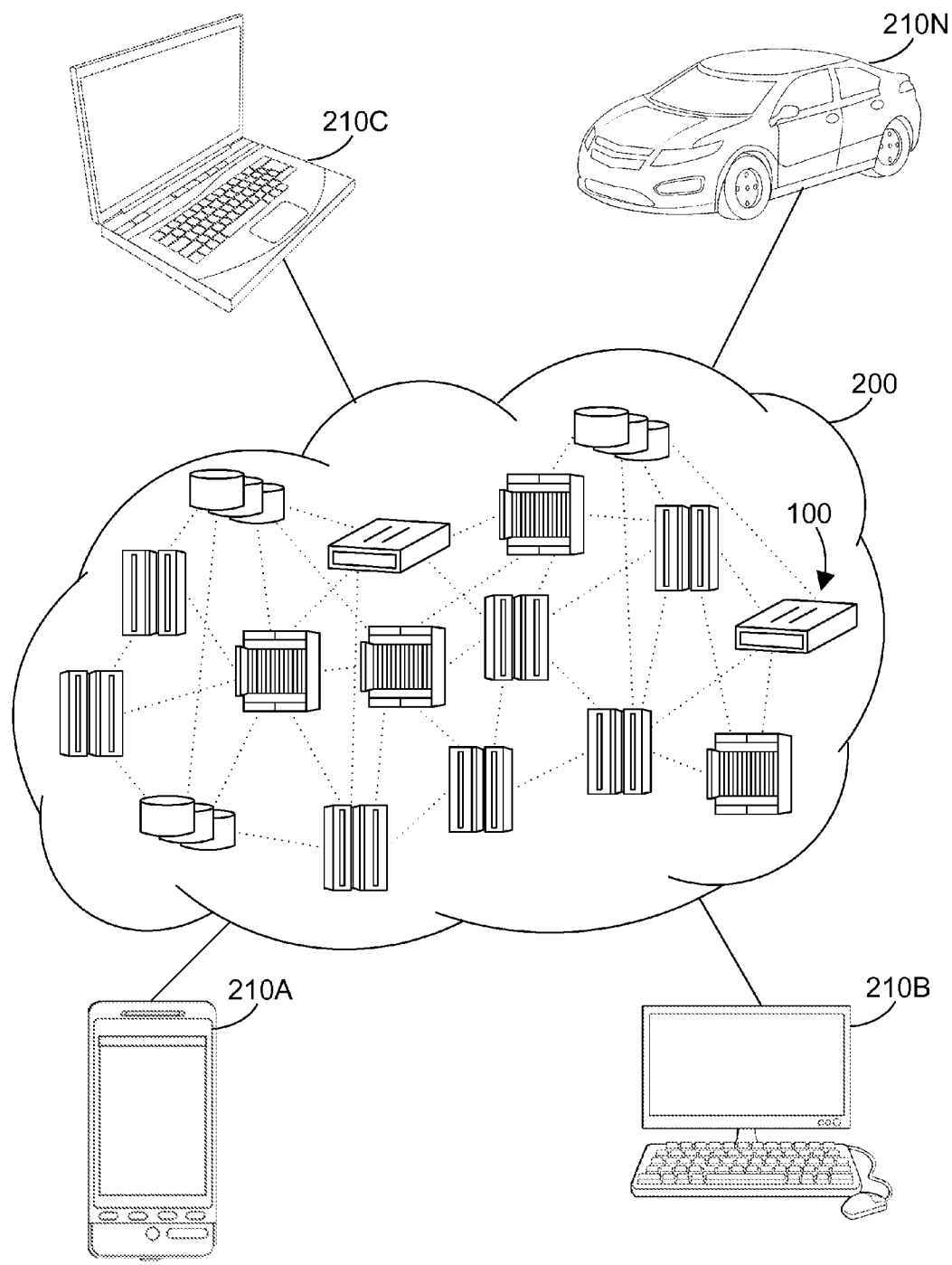
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
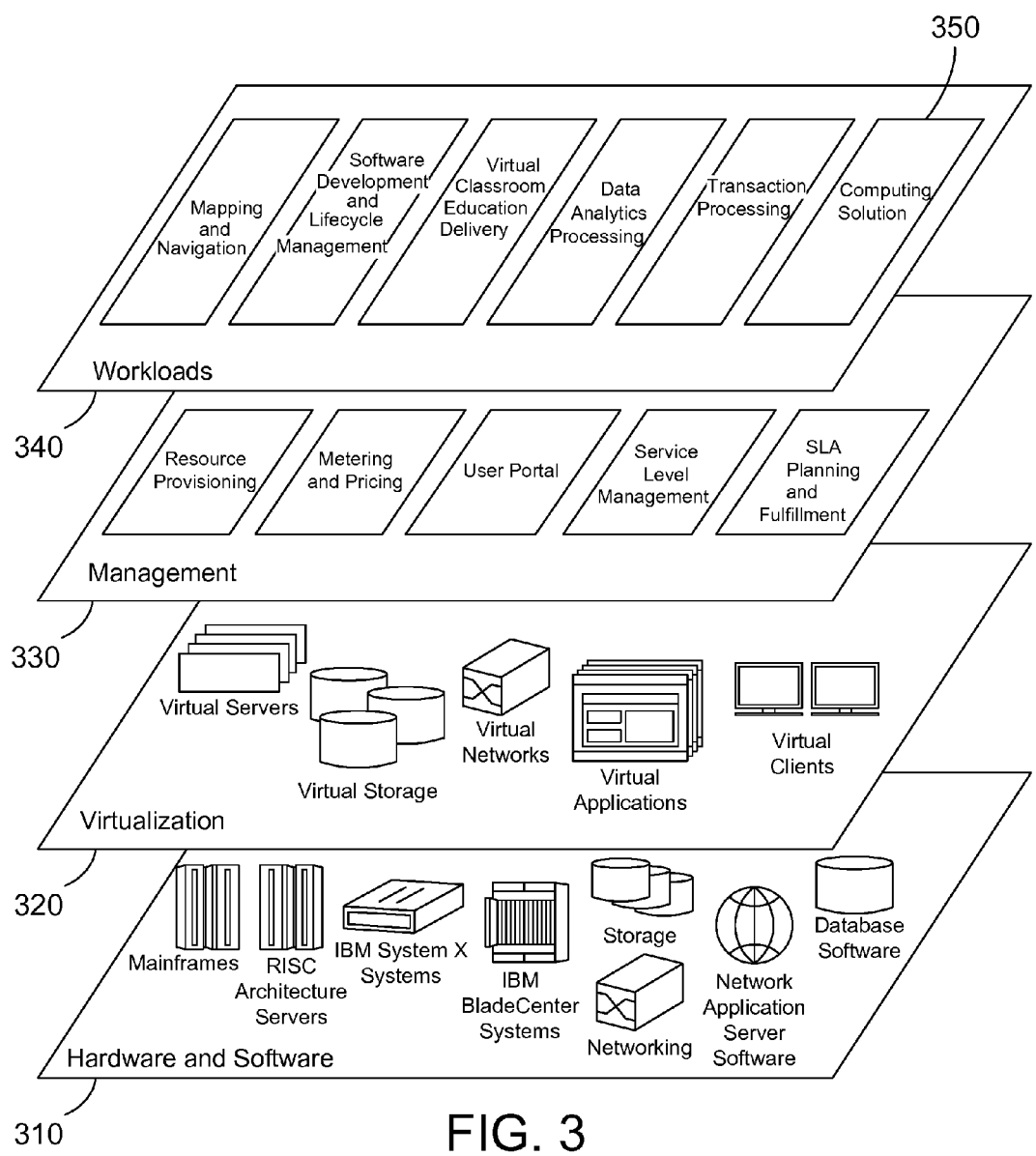
FIG. 3 is a block diagram of abstraction model layers.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; and transaction processing. The cloud solution 350 is representative of a cloud solution that is created and run using a pluggable cloud enabled boot device, as described in more detail below. While the computing solution 350 is shown in FIG. 3 to reside in the workloads layer 340, computing solution 350 actually spans all of the levels shown in FIG. 3, as discussed in detail below.

As will be appreciated by one skilled in the art, aspects of this disclosure may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
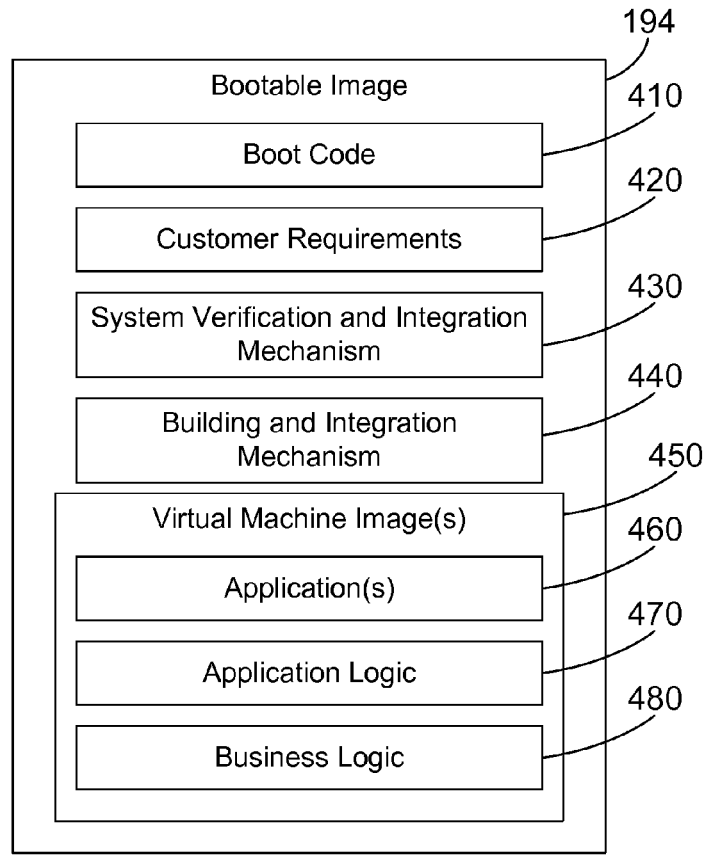
FIG. 4 is a block diagram of a bootable image on a PCEBD.

FIG. 4 shows one suitable example of the bootable image 194 shown in FIG. 1. The bootable image 194 includes boot code 410, customer requirements 420, a system verification and integration mechanism 430, a building and integration mechanism 440, and one or more virtual machine images 450 that each include one or more applications 460, application logic 470 and business logic 480. The boot code 410 is code that allows an apparatus such as computer system/server 110 in FIG. 1 to initialize. Customer requirements 420 include specifications for a desired computing solution. System verification and integration mechanism 430 verifies the system includes sufficient hardware resources to implement the desired computing solution. The building and integration mechanism 440 uses the customer requirements 420 and the system resources determined by the system verification and integration mechanism 430 to determine infrastructure on which the computing solution can be provisioned or deployed, and provisions or deploys the computing solution automatically without intervention of a human user to provide the computing solution. One example of the computing solution is shown at 350 in FIG. 3. While the specific example of the bootable image 194 shown in FIG. 4 includes one or more virtual machine images 450, the applications 460, application logic 470, and business logic 480 can exist within the bootable image 194 separate from any virtual machine image, which will allow determining dynamically a suitable number of virtual machines to deploy based on the customer requirements, as discussed below with reference to FIGS. 15-17. The application(s) 460, application logic 470, and business logic 480 are part of the customer requirements 420 that define how a computing solution is built and deployed.

The most preferred environment for implementing the computing solution is within one or more clouds. As a result, the customer requirements 420 may specify cloud resources, and the building and integration mechanism 440 may build any needed cloud infrastructure, then deploy the computing solution on the cloud infrastructure.

Applications 460 may include any suitable software applications, including cloud applications. Application logic 470 is logic needed to configure and run the application(s) 460. Business logic 480 includes intelligence for making the computing solution function to perform a desired task, such as a task a business needs. The combination of the application logic 470 and the business logic 480 provides most of the customization within the virtual machine image(s) 450. Thus, by specifying applications 460, application logic 470, and business logic 480, the building and integration mechanism 440 has sufficient information to automatically provision the computing solution without intervention by a human user.

Figure 5:
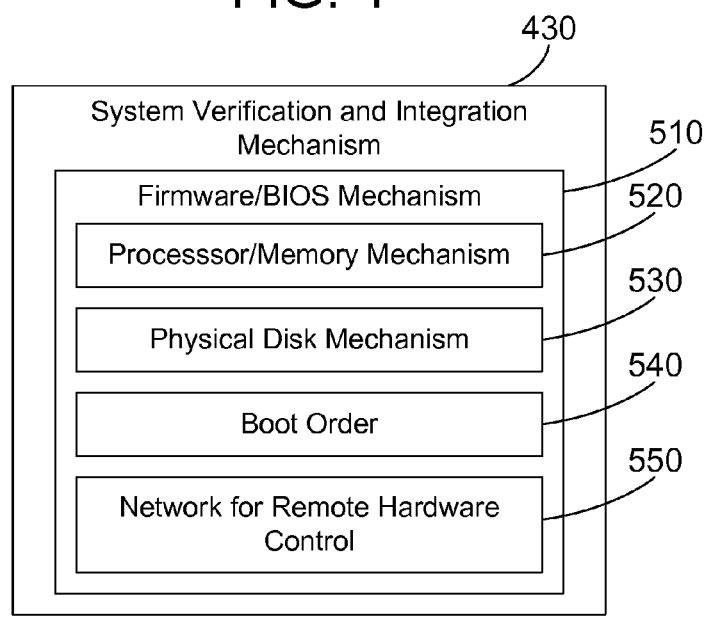
FIG. 5 is a block diagram showing details of the system verification and integration mechanism in FIG. 2.

Details of one suitable example of the system verification and integration mechanism 430 in FIG. 4 is shown in FIG. 5. The system verification and integration mechanism 430 may include a firmware/BIOS mechanism 510 that communicates with the firmware or BIOS (such as firmware 132 in FIG. 1) to determine the hardware resources available on the computer system/server 110. The firmware/BIOS mechanism 510 could communicate with the firmware 132 in FIG. 1 via a Unified Extensible Firmware Interface (UEFI). The firmware/BIOS mechanism 510 includes a processor/memory mechanism 520, a physical disk mechanism 530, a boot order 540, and a network for remote hardware control 550. The processor/memory mechanism 520 determines the processor and memory resources on the computer system. The physical disk mechanism 530 creates a disk partition and installs a file system in the disk partition. The physical disk mechanism 530 can extend the disk, setup a shared file system for different kinds of VM operation requirements, such as migration, fail-over, etc. Different kinds of storage, like solid state drives (SSDs), can also be used. The physical disk mechanism 530 also substitute cloud infrastructure, including a private cloud, a public cloud, or a hybrid of private and public clouds, for the file system in the disk partition. The boot order specifies the order of boot devices. Thus, the boot order 540 could specify to boot first from a DVD drive, then boot from a USB device, then boot from the local hard disk. Such a boot order will allow a computer system to boot from a PCEBD. The network for remote hardware control 550 is a network such as an Intelligent Platform Management Interface (IPMI) network that allows remotely controlling the hardware. The IPMI network can be used for remote provisioning, to monitor hardware status, to remove power control, etc.

Figure 6:
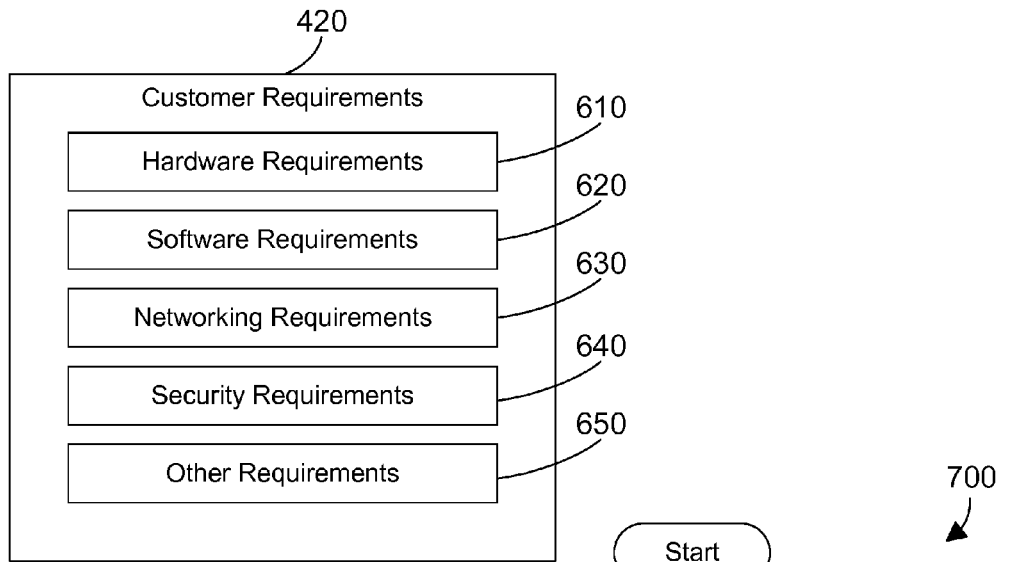
FIG. 6 is a block diagram showing categories of customer requirements.

Examples of categories of customer requirements are shown at 420 in FIG. 6 to include hardware requirements 610, software requirements 620, networking requirements 630, security requirements 640, and other requirements 650. Hardware requirements 610 may include the required platform type and the required number of processors and memory. Software requirements 620 may include an operating system, software environments, and dependencies for software packages. Networking requirements 630 may include number, type and configuration of physical and virtual networks. Security requirements 640 may include any needed requirements related to security, including access control lists. Other requirements 650 may include any suitable requirement not specifically described in the other requirements 610, 620, 630 and 640 above. For example, other requirements 650 could specify a particular number of VMs to deploy, along with their associated application(s), application logic, and business logic.

Figure 7:
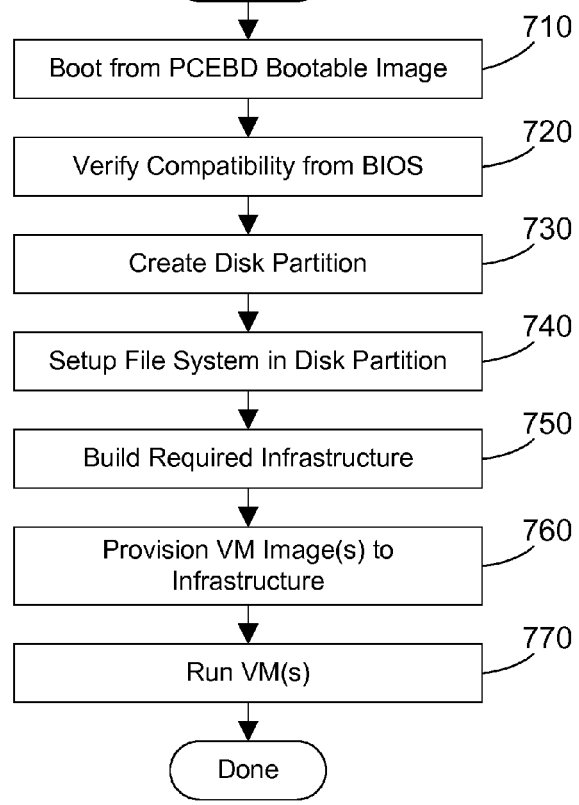
FIG. 7 is a flow diagram of a method for deploying a computing solution using a PCEBD.

Referring to FIG. 7, a method 700 shows steps for automatically provisioning a computing solution using a PCEBD. A computer system is booted from the PCEBD bootable image (step 710). Compatibility of the customer requirements with the hardware is verified via the BIOS (step 720). A disk partition is created (step 730). A file system is setup in the disk partition (step 740). Required infrastructure is then built (step 750). One or more VM images are provisioned to the infrastructure (step 760). The VMs are run (step 770). At this point the computing solution has been provisioned and is running. Method 700 is then done.

Figure 8:
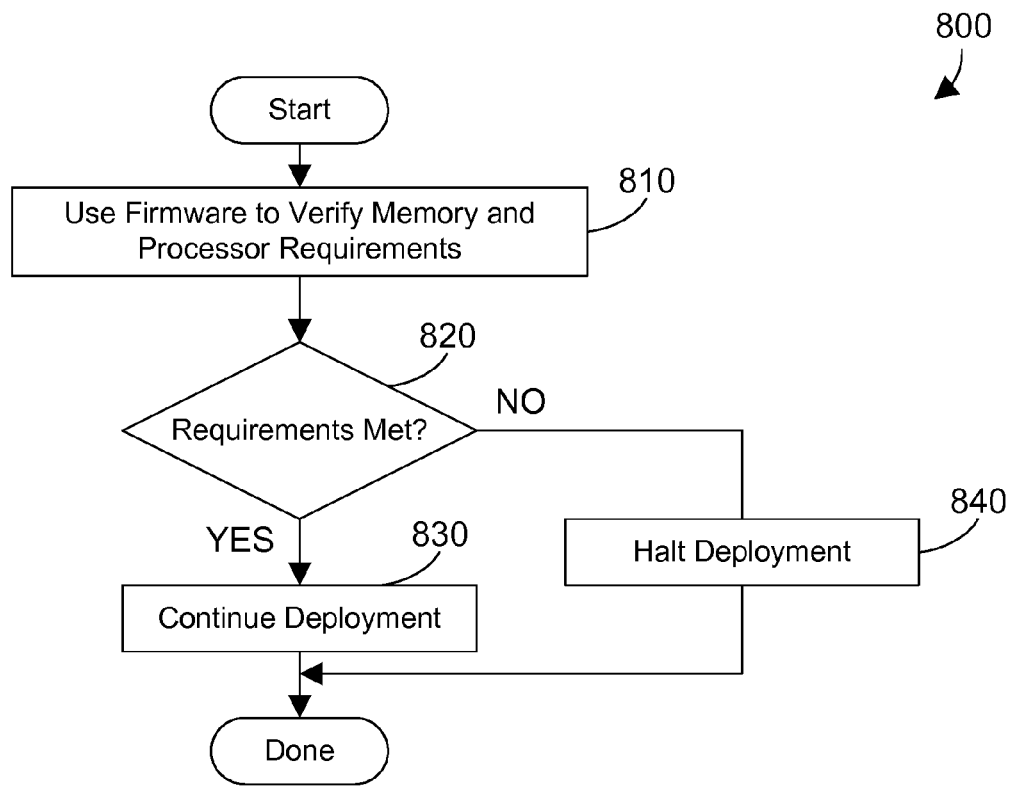
FIG. 8 is a flow diagram of a method for verifying memory and processor requirements before deploying the cloud computing solution in a PCEBD.

Referring to FIG. 8, a method 800 shows one suitable implementation for step 720 in FIG. 7. The firmware is used to verify memory and processor requirements specified in the customer requirements (step 810). When the requirements are met (step 820=YES), deployment continues (step 830). When the requirements are not met (step 820=NO), deployment is halted (step 840). Method 800 thus verifies via system firmware the computer system has sufficient resources for deploying the computing solution before deploying the computing solution.

Figure 9:
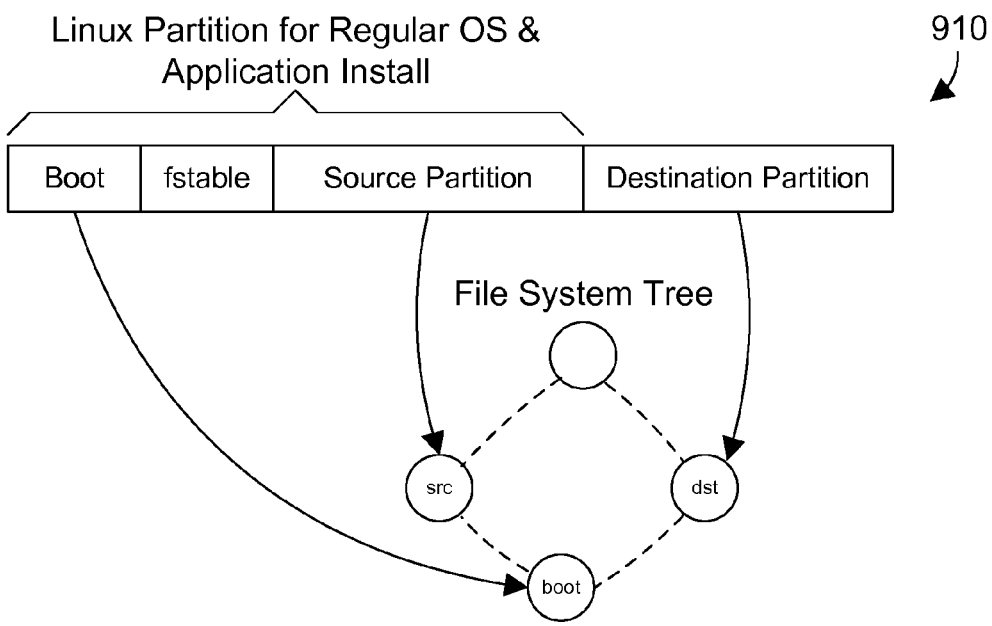
FIG. 9 is a block diagram showing relocation of a file system to cloud resources.

FIG. 9 shows a disk partition that has been specifically designed for extracting the pre-built file system image from an existing virtual machine in the lab after testing. This file system will then be used on the customer site and re-built based on the exact file system, without any hardware dependency. An entry 910 in the bootable image includes a boot portion, a file system table fstable, a source partition, and a destination partition. The file system can then be created as shown in the file system tree in a manner that is not dependent on any particular disk type or file system.

Figure 10:
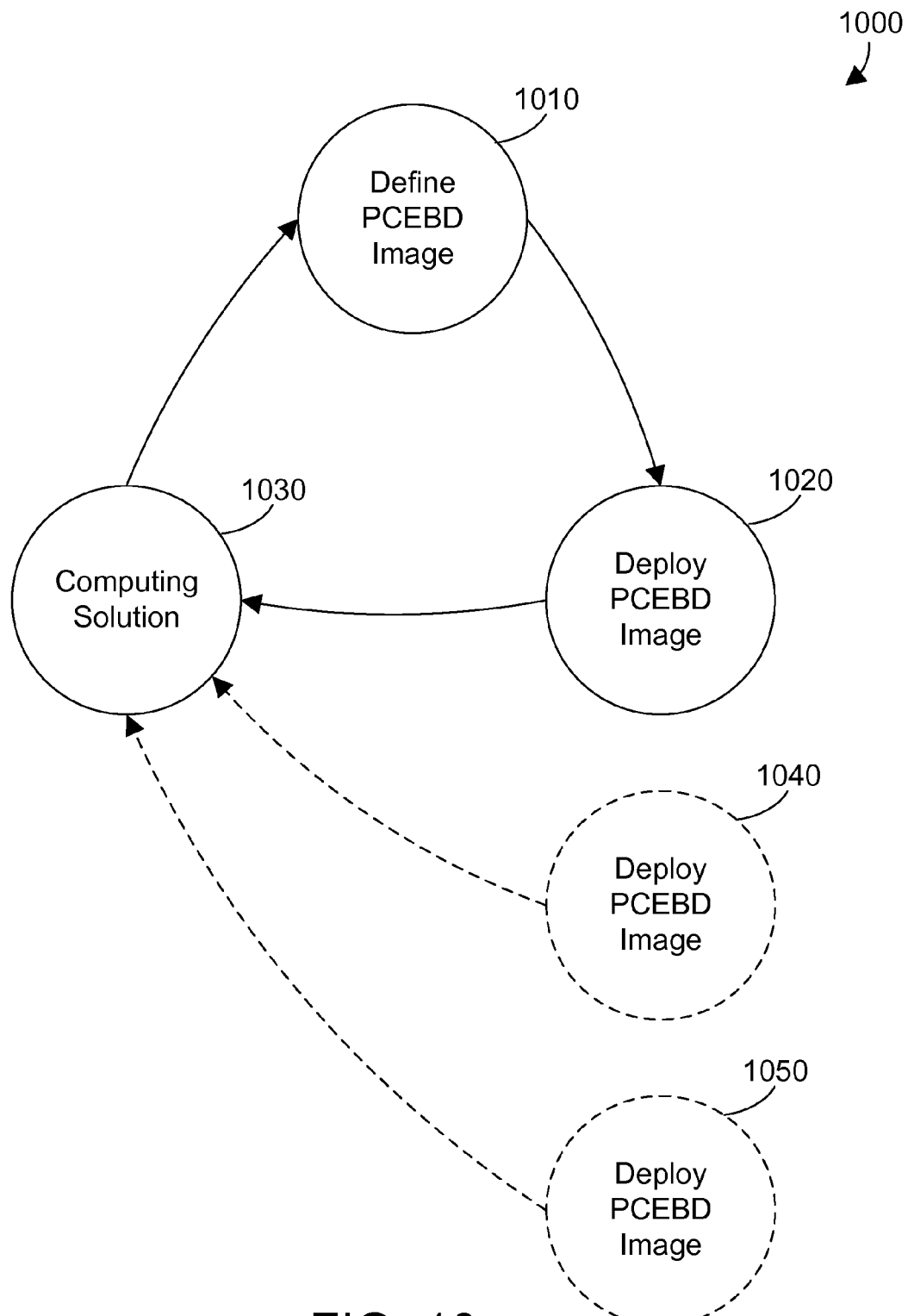
FIG. 10 is a block diagram showing modification of a cloud environment deployed from a PCEBD and how those modifications are fed back into the definition of the PCEBD image.

Referring to FIG. 10, a method 1000 shows how a bootable image for a PCEBD can be defined, deployed, then modified, which can, in turn, change the PCEBD image. Thus, a PCEBD image is defined in step 1010. The PCEBD image is deployed in step 1020, which creates a running computing solution 1030. The computing solution 1030 may be modified, which results in the modifications being fed back into the PCEBD definition 1010. In this manner a PCEBD at 1010 can be used to deploy a computing solution on a test platform at 1020, the computing solution can then be modified at 1030, and the modifications can be reflected in the PCEBD image at 1010.

Modification of the computing solution at 1030 can be done by any suitable person or software. One specific scenario is shown in FIG. 10, where multiple PCEBD images 1020, 1040 and 1050 are deployed to modify the same computing solution 1030. Modifications may be done during a "test and change" phase of developing the computing solution. The resulting modifications to the PCEBD image 1010 could include all the modifications effected by all of the deployed PCEBD images 1020, 1040 and 1050. In this simple example, a first PCEBD is deployed at 1020, which results in a computing solution running at 1030. A second PCEBD is deployed at 1040, and a third at 1050, both of which make modifications to the computing solution 1030. The resulting modifications are then reflected in the PCEBD image 1010 so the resulting PCEBD image 1010 after being modified reflects the computing solution after being instantiated and modified by the various PCEBDs 1020, 1040 and 1050. Note a computing solution can be deployed in various pieces and stages. Thus, a computing solution could be subdivided into four different cooperating portions, with each portion being deployed via a PCEBD. Note also that PCEBDs can be nested, where one PCEBD contains one or more other PCEBDs.

Figure 11:
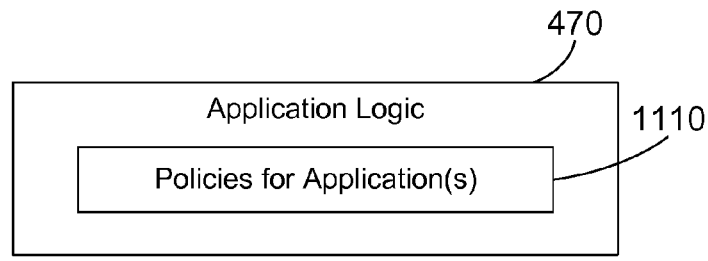
FIG. 11 is a block diagram showing details of the application logic shown in FIG. 2.

FIG. 11 shows that application logic 470 shown in FIG. 4 may include policies for one or more applications 1110. Policies for applications may include VM boot orders; making multiple VMs as a template (VM patterning) so next time the VMs can be instantiated together; and other policies such as VM disaster recovery, which might indicate to restart a VM or migrate the VM to another host in the event of a disaster.

Figure 12:
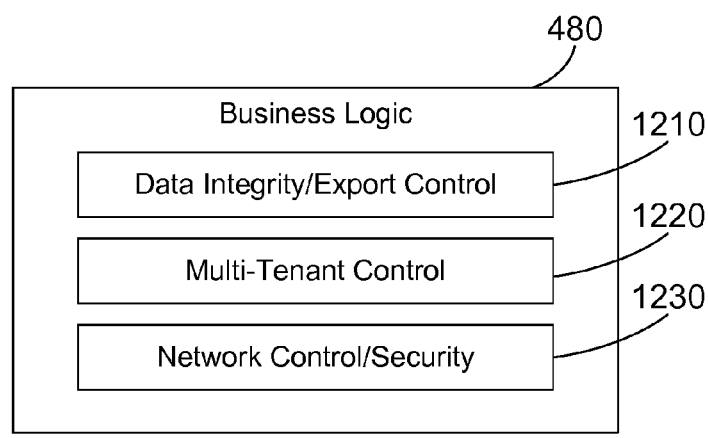
FIG. 12 is a block diagram showing details of the business logic shown in FIG. 2.

Business logic 480 shown in FIG. 4 may include, for example, data integrity/export control 1210, multi-tenant control 1220, and network control/security 1230. The data integrity/export control 1210 defines how different entities communicate. The multi-tenant control 1220 defines account control and management, for example, for billing, resource isolation, SLA, etc. The network control/security 1230 specifies how networks are controlled and the security needed to access each of the networks. Business logic 480 may include many other features not shown in FIG. 12. Business logic 480 broadly includes any information that customizes the PCEBD bootable image to provide the computing solution.

Figure 13:
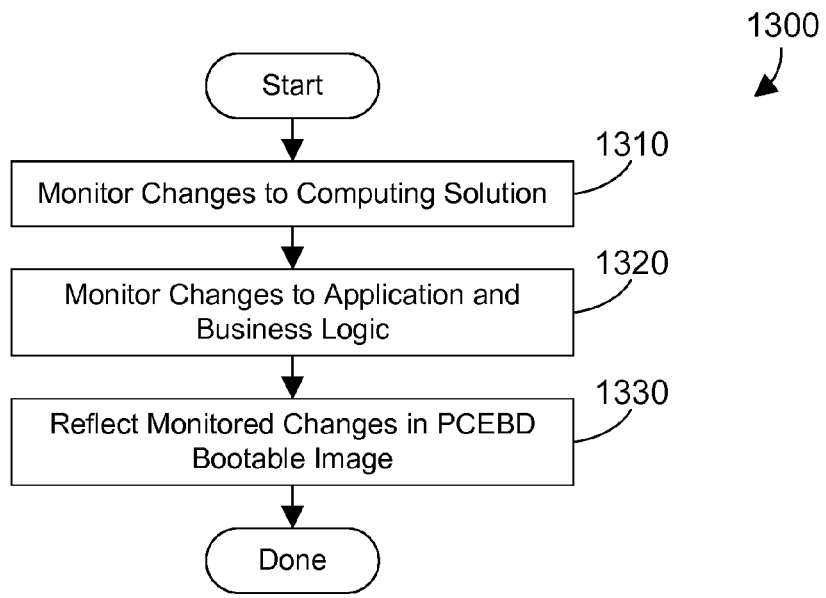
FIG. 13 is a flow diagram of a method for monitoring changes to a deployed cloud environment and reflecting those changes in the PCEBD definition.

Referring to FIG. 13, a method 1300 monitors changes to a computing solution (step 1310), monitors changes to the application logic and the business logic (step 1320), and reflects the monitored changes in the PCEBD bootable image (step 1330). Method 1300 is a different way of showing the process illustrated in FIG. 10 and discussed above.

Figure 14:
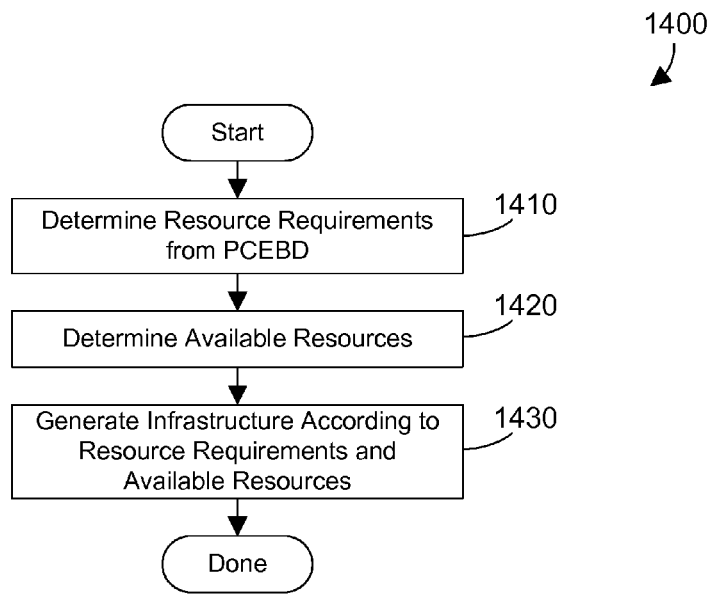
FIG. 14 is a flow diagram of a method for generating infrastructure based on information in the PCEBD.

Referring to FIG. 14, a method 1400 determines resource requirements from the PCEBD (step 1410), determines available resources (step 1420), and generates infrastructure according to the resource requirements and available resources (step 1430). The resource requirements may be specified in the customer requirements 420 shown in FIG. 4. The available resources may be determined in step 1420 by the firmware/BIOS mechanism 510 shown in FIG. 5. Method 1400 is preferably performed by the building and integration mechanism 440 shown in FIG. 4.

Figures 15, 16, 17:
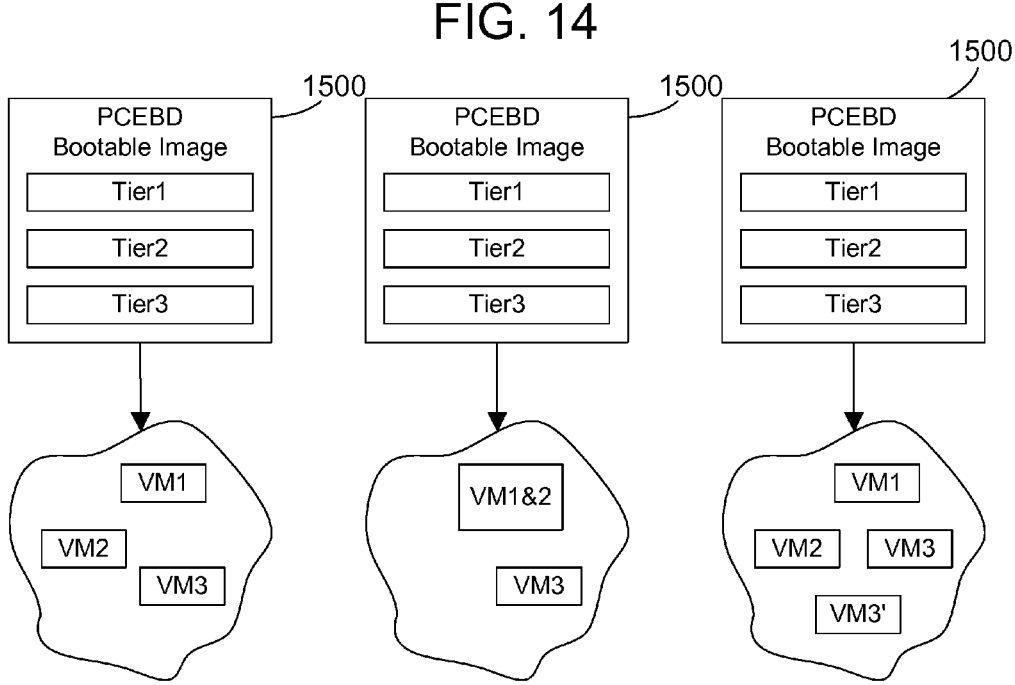
FIG. 15 is a block diagram showing deployment of a three-tier day trading cloud computing solution to three virtual machines.
FIG. 16 is a block diagram showing deployment of a three-tier day trading cloud computing solution to two virtual machines.
FIG. 17 is a block diagram showing deployment of a three-tier day trading cloud computing solution to four virtual machines.

FIGS. 15-17 illustrate how the building and integration mechanism 440 can deploy a computing solution differently depending on available resources. We assume the PCEBD bootable image 1500 includes three distinct tiers as shown in FIG. 15 for a three-tier application for day-trading stocks. We assume for this example that Tier1 includes active-standby or active-active memory cache to speed Internet access, which requires a large memory but small disk space; Tier2 is a stateless web server in a pool, to fulfill business domain logic; and Tier3 is a database like SQL server or MySQL in either a cluster or a master-slave configuration. For the example shown in FIG. 15, the building and integration mechanism 440 generates three virtual machines VM1, VM2 and VM3 that correspond to each of the three respective tiers. For the example shown in FIG. 16, the building and integration mechanism 440 generates two virtual machines, a first VM1&2 that implements both Tier 1 and Tier 2, and a second VM3 that implements Tier3. For the example shown in FIG. 17, the building and integration mechanism 440 generates four virtual machines, a first VM1 for Tier1, a second VM2 for Tier2, and two more VM3 and VM3' for Tier3. These simple examples in FIGS. 15-17 illustrate the building and integration mechanism 440 can generate any suitable infrastructure using any suitable number of virtual machines, depending on the available resources.

Figure 18:
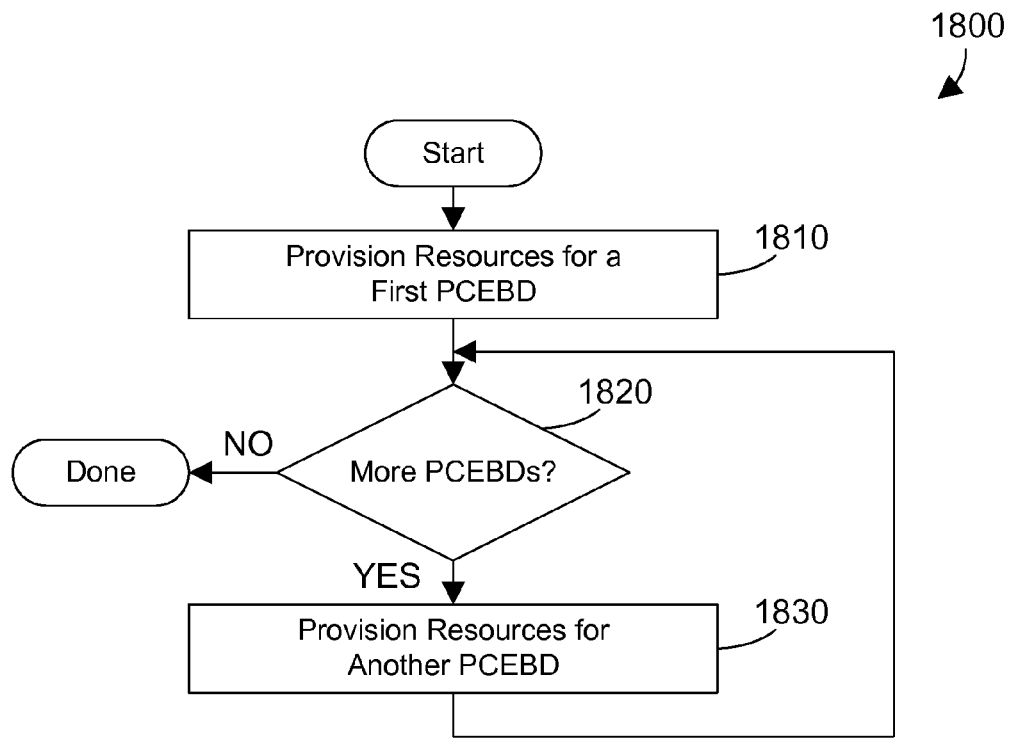
FIG. 18 is a flow diagram of a method for provisioning resources from multiple PCEBDs.

As discussed above with respect to items 1020, 1040 and 1050 in FIG. 10, multiple PCEBDs may be provisioned to modify a running computing solution. Referring to FIG. 18, method 1800 provisions resources for a first PCEBD (step 1810). When there are more PCEBDs to provision (step 1820=YES), method 1800 provisions resources for another PCEBD (step 1830), then loops back to step 1820. This process continues until there are no more PCEBDs to provision (step 1820=NO), at which point method 1800 is done. Method 1800 is also graphically represented in a different form in FIG. 10.

Figure 19:
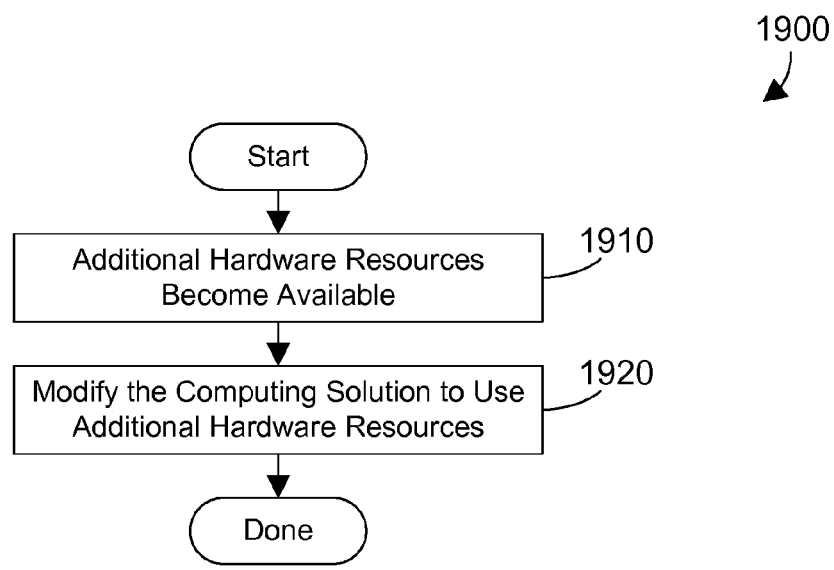
FIG. 19 is a flow diagram of a method for modifying a computing solution to use additional hardware resources that become available.

One feature of the building and integration mechanism 440 is the ability to dynamically adjust when new resources become available. Referring to FIG. 19, a method 1900 begins when additional hardware resources become available (step 1910). The computing solution can then be modified to use the additional hardware resources (step 1920). A simple example will illustrate. Let's assume the building and integration mechanism 440 initially provisions three virtual machines, one for each of the three tiers as shown in FIG. 15. Let's further assume that four additional processors are added to the hardware. The building and integration mechanism can detect these added processors, and reconfigure the computing solution to take advantage of the new processors. Thus, VM3 could be split into VM3 and VM3' as shown in FIG. 17, with the additional processors used in one or both of VM3 and VM3'. In addition to dynamically adjusting, the PCEBD bootable image would also be updated to reflect the change.

Figure 20:
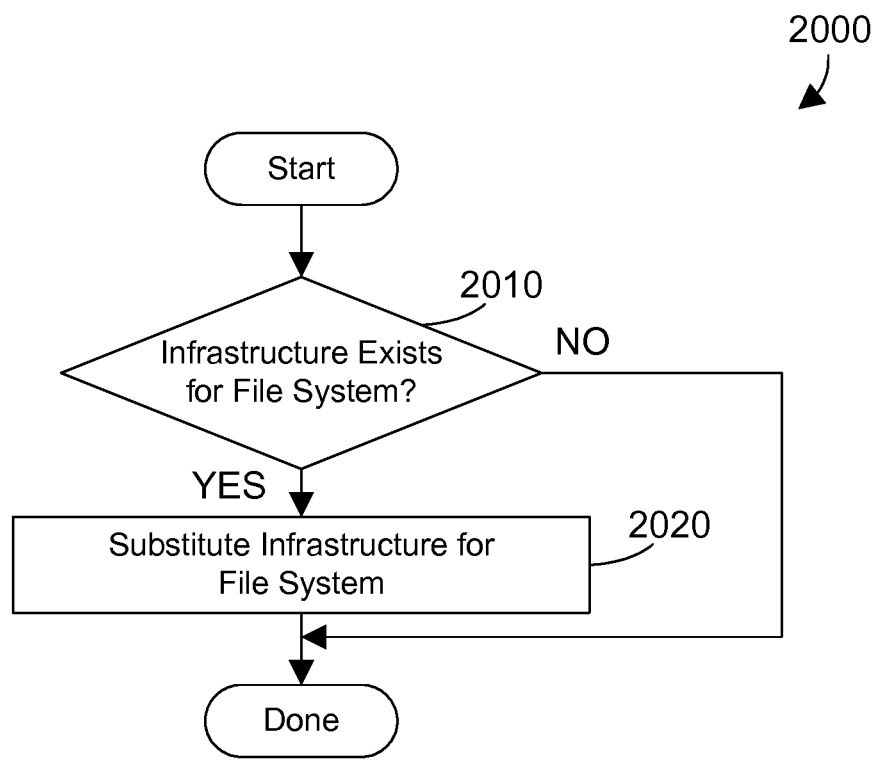
FIG. 20 is a flow diagram of a method for substituting infrastructure for a file system in a computing solution.

It is possible to deploy the file system for a disk partition on infrastructure, such as cloud infrastructure. For example, referring to FIG. 20, when infrastructure exists for the file system (step 2010=YES), the infrastructure could be substituted for the file system (step 2020). In some situations, a computer system may have a pre-installed operating system running on a particular server computer system, and it could be undesirable to reinstall all the software due to limitations in the software license. For this case, a new cloud solution could be deployed on top of the existing system.

Figure 21:
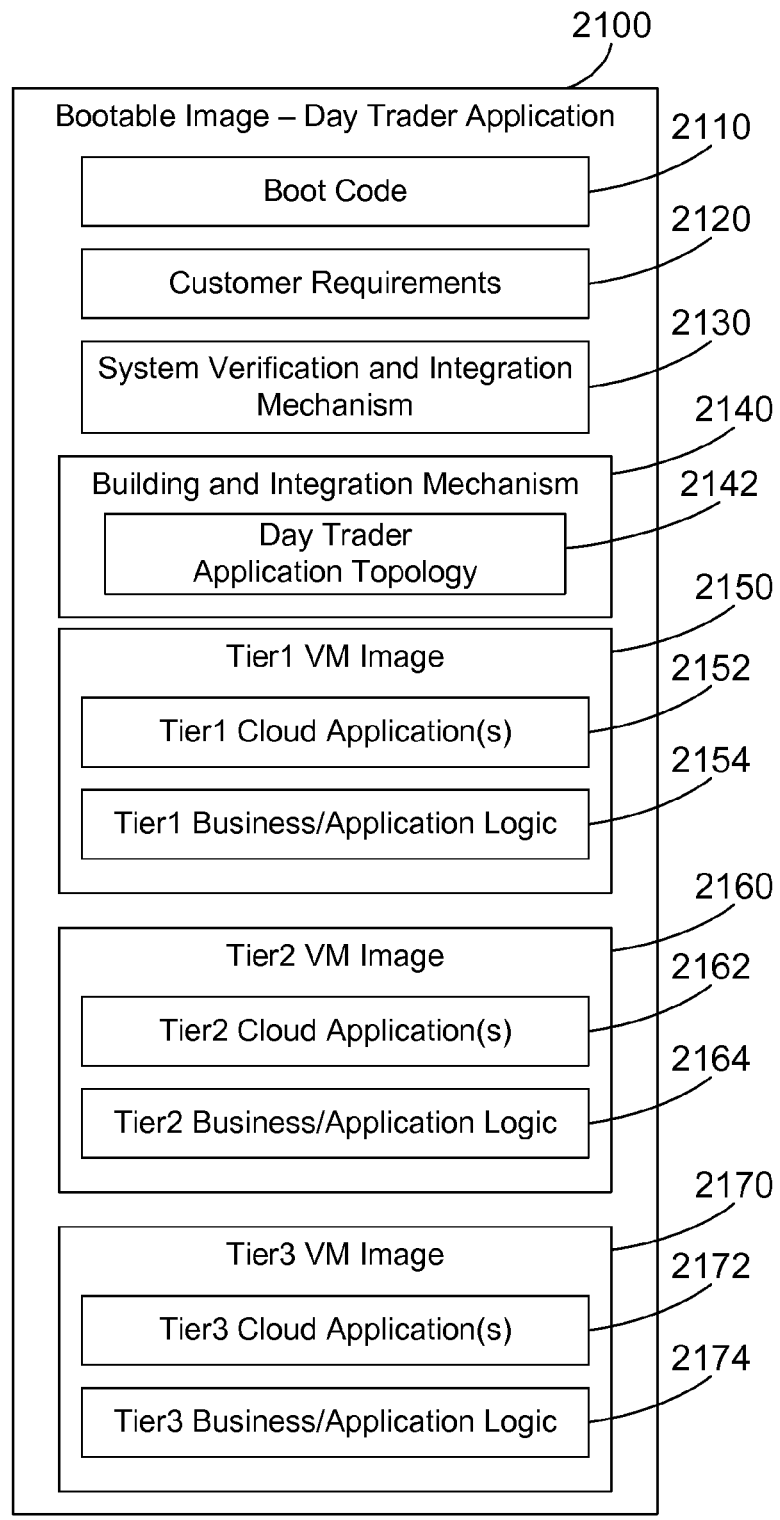
FIG. 21 is a block diagram showing the bootable image for a PCEBD that implements the three-tier day trading cloud computing solution.

A simple example is now provided for the three-tier day trader application represented in FIGS. 15-17. A bootable image of the day trader application 2100 is shown in FIG. 21. The day trader application 2100 includes boot code 2110, customer requirements 2120, system verification and integration mechanism 2130, building and integration mechanism 2140, and three virtual machine images 2150, 2160 and 2170 corresponding to each of the three tiers in the three-tier application. Note the building and integration mechanism 2140 may generate the infrastructure according to a day trader application topology 2142, which can be specified in the customer requirements, or which can be dynamically determined. For this specific example, we assume the day trader application topology 2142 specifies three virtual machines, one for each tier, which results in the three virtual machine images 2150, 2160 and 2170 shown in FIG. 21. Note that each tier includes one or more corresponding applications and corresponding business and application logic. Thus, the Tier1 VM Image 2150 includes one or more Tier1 cloud applications 2152 and Tier1 business/application logic 2154. In similar fashion, the Tier2 VM Image 2160 includes one or more Tier2 cloud applications 2162 and Tier2 business/application logic 2164, and the Tier3 VM Image 2170 includes one or more Tier3 cloud applications 2172 and Tier3 business/application logic 2174.

Figure 22:
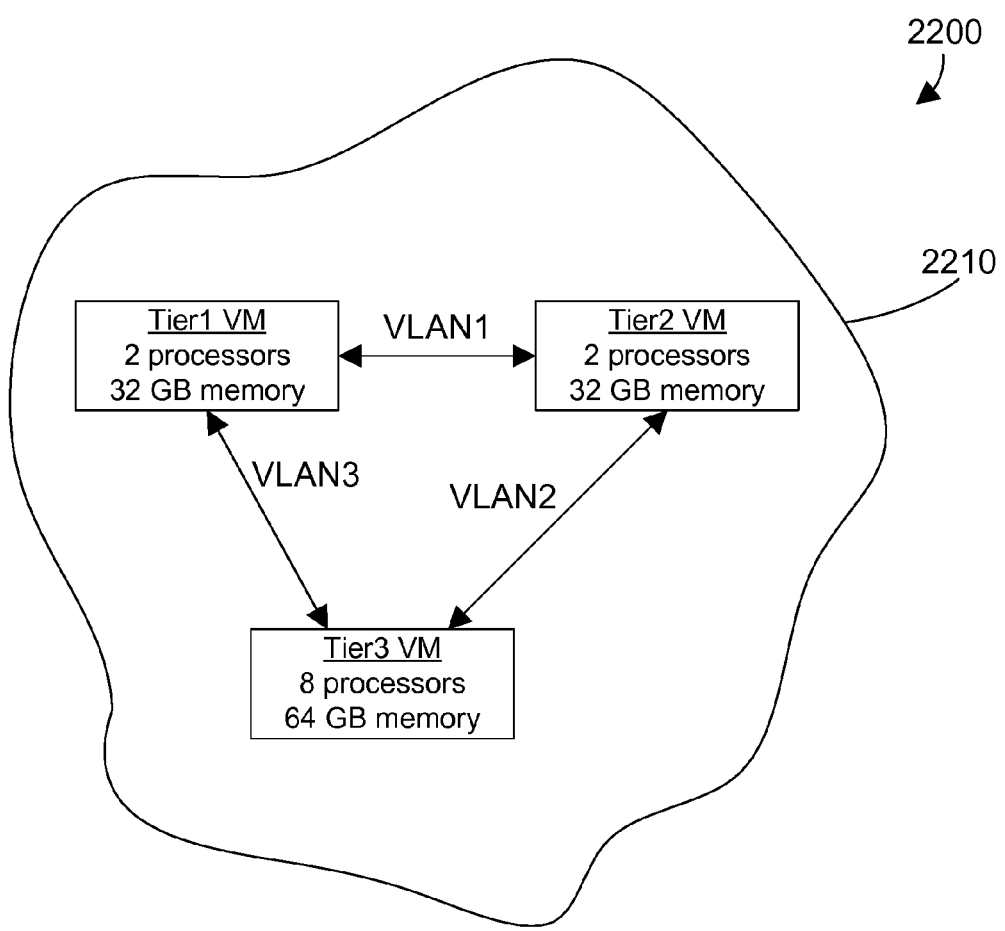
FIG. 22 is a block diagram showing the three-tier day trading cloud computing solution that was created from the PCEBD image shown in FIG. 21.

When the bootable image 2100 for the day trader application is used to boot a computer system, the result will be the steps shown in FIG. 7 for this bootable image. The result will be automatic provisioning of a computing solution without intervention of a human user. Note the provisioning is preferably done in one or more clouds, thereby providing automatic provisioning of a computing solution to a cloud environment. One example for the three-tier day trading application once provisioned and running is shown at 2200 in FIG. 22. Note the Tier1 VM includes 2 processors and 32 GB memory, the Tier2 VM includes 2 processors and 32 GB memory, and the Tier3 VM includes 8 processors and 64 GB memory. The three VMS communicate with each other over virtual local area networks (VLANs), such as VLAN1, VLAN2 and VLAN3 shown in FIG. 22. These three virtual machines and three VLANs are implemented within a cloud 2210.

The claims and disclosure herein provide a pluggable cloud enablement boot device (PCEBD), which is a bootable device that includes all information needed to automatically provision hardware and software to create a computing solution that meets customer requirements. This allows for quickly deploying a computing solution in a manner that eliminates many manual steps that are typically performed today. The PCEBD uses firmware to verify a given platform has sufficient resources to deploy the PCEBD. The computing solution, once provisioned and running, can be modified, and these modifications may be reflected in the definition of the PCEBD. In addition, a computing solution may include multiple resources provisioned from multiple PCEBDs, which can be packaged into a PCEBD that will include other PCEBDs. The result is a way to deploy computing solutions that is much more efficient than the manual methods used in the prior art.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method executed by at least one processor for providing a computing solution, the method comprising:
   providing a boot device that comprises a computer readable non-transitory storage that includes a boot image that comprises:
     boot code executed by the at least one processor that initializes the apparatus;
     requirements for the computing solution that include at least one software application and business logic;
     a system verification and integration mechanism; and
     a building and integration mechanism;
   booting a computer system from the bootable image on the boot device;
   the system verification and integration mechanism comparing available hardware and software with the requirements for the computing solution and determining computing resources from the available hardware and software that meet the requirements for the computing solution; and
   the building and integration mechanism automatically provisioning the computing resources with the at least one software application and the business logic without intervention of a human user to provide the computing solution.

2. The method of claim 1 wherein the requirements for the computing solution comprise hardware requirements, software requirements, networking requirements and security requirements.

3. The method of claim 1 wherein the computing solution comprises a cloud computing solution and the building and integration mechanism provisions the computing resources in at least one cloud.

4. The method of claim 1 wherein the system verification and integration mechanism determines the available hardware and software by querying firmware in the apparatus.

5. The method of claim 4 wherein the system verification and integration mechanism queries the firmware to determine available processors and memory.

6. The method of claim 1 wherein the system verification and integration mechanism creates a disk partition and installs a file system in the disk partition.

7. The method of claim 1 wherein changes to the computing solution after the building and integration mechanism automatically provisions the computing resources are used to modify the boot image to reflect the changes.

8. The method of claim 1 wherein the boot device comprises at least one image of at least one other boot device.

9. A computer-implemented method executed by at least one processor for providing a computing solution, the method comprising:
- providing a boot device that comprises a computer readable non-transitory storage that includes a boot image that comprises:
  - boot code executed by the at least one processor that initializes the apparatus;
  - requirements for the computing solution that include at least one software application, business logic, hardware requirements, software requirements, networking requirements and security requirements;
  - a system verification and integration mechanism; and
  - a building and integration mechanism;
- booting a computer system from the bootable image on the boot device;
- the system verification and integration mechanism comparing available hardware and software with the requirements for the computing solution and determining computing resources from the available hardware and software that meet the requirements for the computing solution, wherein the system verification and integration mechanism determines the available hardware and software by querying firmware in the apparatus, including querying the firmware to determine available processors and memory; and
- the building and integration mechanism automatically provisioning the computing resources with the at least one software application and the business logic without intervention of a human user to provide the computing solution, wherein changes to the computing solution after the building and integration mechanism automatically provisions the computing resources are used to modify the boot image to reflect the changes.

10. The method of claim 9 wherein the computing solution comprises a cloud computing solution and the building and integration mechanism provisions the computing resources in at least one cloud.

* * * * *